United States Patent
Rohee et al.

(10) Patent No.: US 8,075,039 B2
(45) Date of Patent: Dec. 13, 2011

(54) SYSTEM COMPRISING A MOTOR VEHICLE SEAT RUNNER AND BODY DESTINED TO BE FIXED THERETO, AND METHOD FOR MAKING SAME

(75) Inventors: René Rohee, La Chapelle Biche (FR); Jean-Marie Fretel, Ger (FR)

(73) Assignee: Faurecia Sieges d'Automobile, Nanterre (FR)

( * ) Notice: Subject to any disclaimer, the term of this patent is extended or adjusted under 35 U.S.C. 154(b) by 565 days.

(21) Appl. No.: 12/293,335

(22) PCT Filed: Mar. 23, 2007

(86) PCT No.: PCT/FR2007/000503
§ 371 (c)(1), (2), (4) Date: Sep. 17, 2008

(87) PCT Pub. No.: WO2007/116133
PCT Pub. Date: Oct. 18, 2007

(65) Prior Publication Data
US 2009/0102224 A1    Apr. 23, 2009

(30) Foreign Application Priority Data

Apr. 10, 2006 (FR) .................................... 06 03167

(51) Int. Cl.
*B60N 2/07* (2006.01)
(52) U.S. Cl. ............... 296/65.13; 297/344.11; 248/429
(58) Field of Classification Search ............... 296/65.13, 296/65.14, 65.15; 248/424, 429; 297/344.11, 297/216.1
See application file for complete search history.

(56) References Cited

U.S. PATENT DOCUMENTS

| | | | |
|---|---|---|---|
| 5,470,121 A * | 11/1995 | Ito | 296/65.14 |
| 6,224,130 B1 * | 5/2001 | Sasaki et al. | 296/65.13 |
| 6,328,272 B1 * | 12/2001 | Hayakawa et al. | 248/429 |
| 6,341,819 B1 * | 1/2002 | Kojima et al. | 297/341 |
| 6,352,312 B1 * | 3/2002 | Rees | 297/470 |
| 6,798,196 B2 * | 9/2004 | Kojima et al. | 324/207.26 |
| 6,860,538 B2 * | 3/2005 | Muller et al. | 296/65.13 |
| 7,309,107 B2 * | 12/2007 | Smith et al. | 297/344.11 |
| 7,506,856 B2 * | 3/2009 | Ikegaya et al. | 248/430 |
| 7,798,462 B2 * | 9/2010 | Yoshida et al. | 248/429 |
| 2002/0084683 A1 * | 7/2002 | Christopher | 297/344.11 |

(Continued)

FOREIGN PATENT DOCUMENTS

DE          3405097          2/1984

(Continued)

OTHER PUBLICATIONS

International Search Report and Written Opinion from counterpart application No. PCT/FR2007/000503; Report dated Dec. 5, 2008.

(Continued)

*Primary Examiner* — Jason S Morrow
(74) *Attorney, Agent, or Firm* — Miller, Matthias & Hull LLP

(57) ABSTRACT

The invention concerns a rail comprising a fixed profiled section and a mobile profiled section sliding relative to the fixed profiled section. The body has a linking portion wherein the body is shaped like a plate having first and second opposite lateral surfaces, and an edge linking said first and second surfaces. A first profiled section comprises a groove. The linking portion is tightly fitted in the groove. The plate is attached to the first profiled section.

27 Claims, 7 Drawing Sheets

U.S. PATENT DOCUMENTS

2004/0232303 A1 11/2004 Rausch et al.
2010/0207419 A1* 8/2010 Kojima et al. ............. 296/65.13

FOREIGN PATENT DOCUMENTS

| DE | 196 13 432 | 7/1997 |
| DE | 102 50 212 | 5/2004 |
| FR | 2872103 | 6/2004 |
| GB | 1 007 119 | 10/1965 |

OTHER PUBLICATIONS

European Search Report from priority application No. FR 0603167; Report dated Feb. 27, 2007; European Patent Office.

* cited by examiner

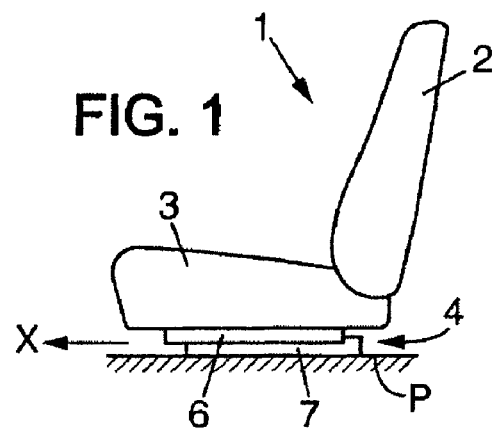
FIG. 1
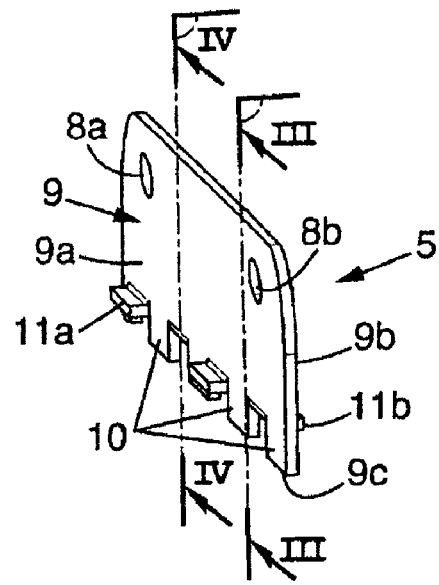
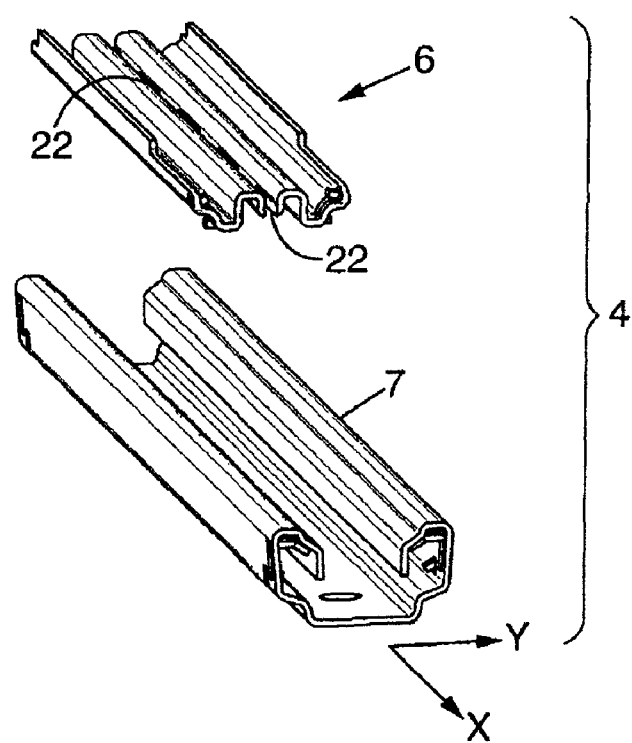
FIG. 2

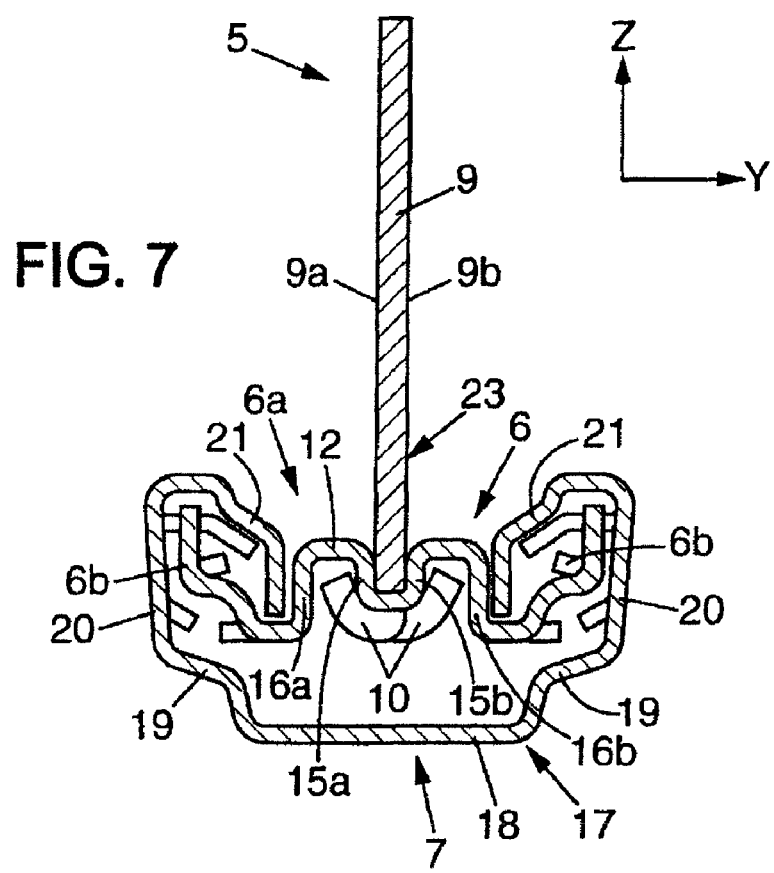
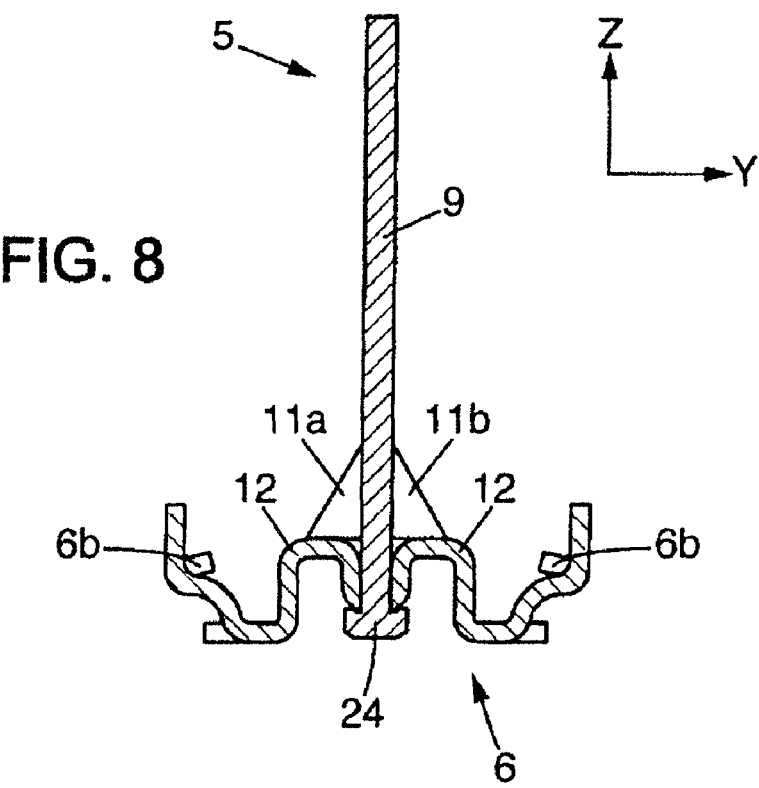

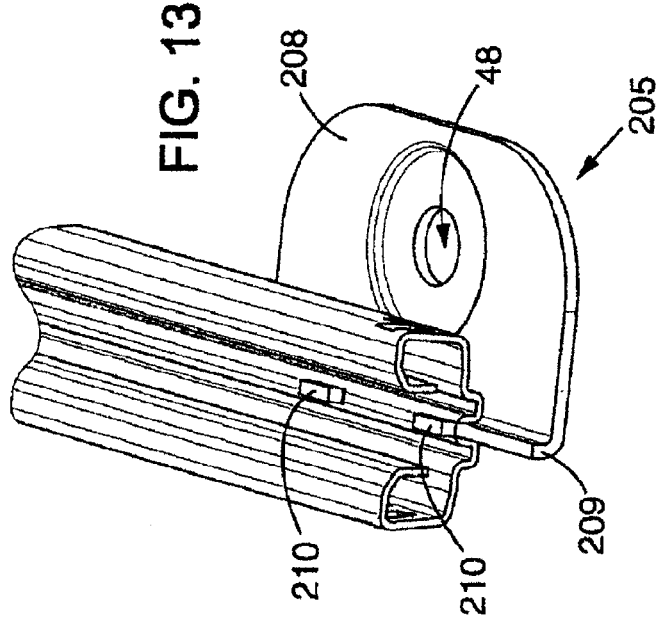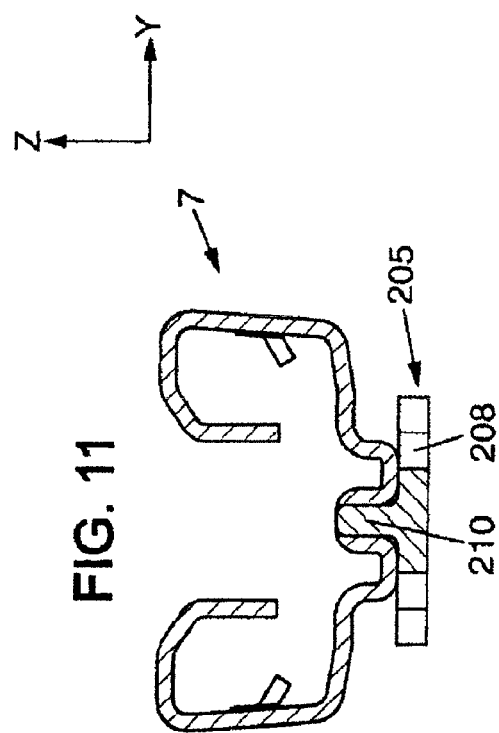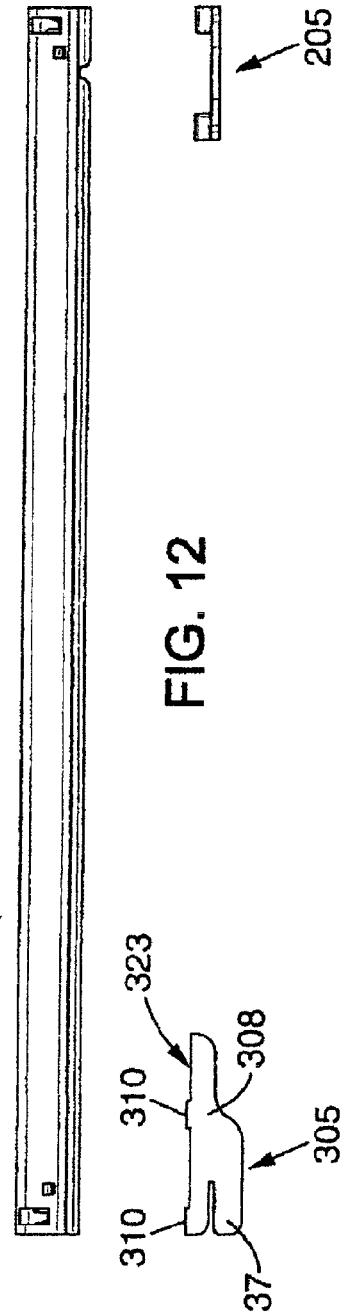

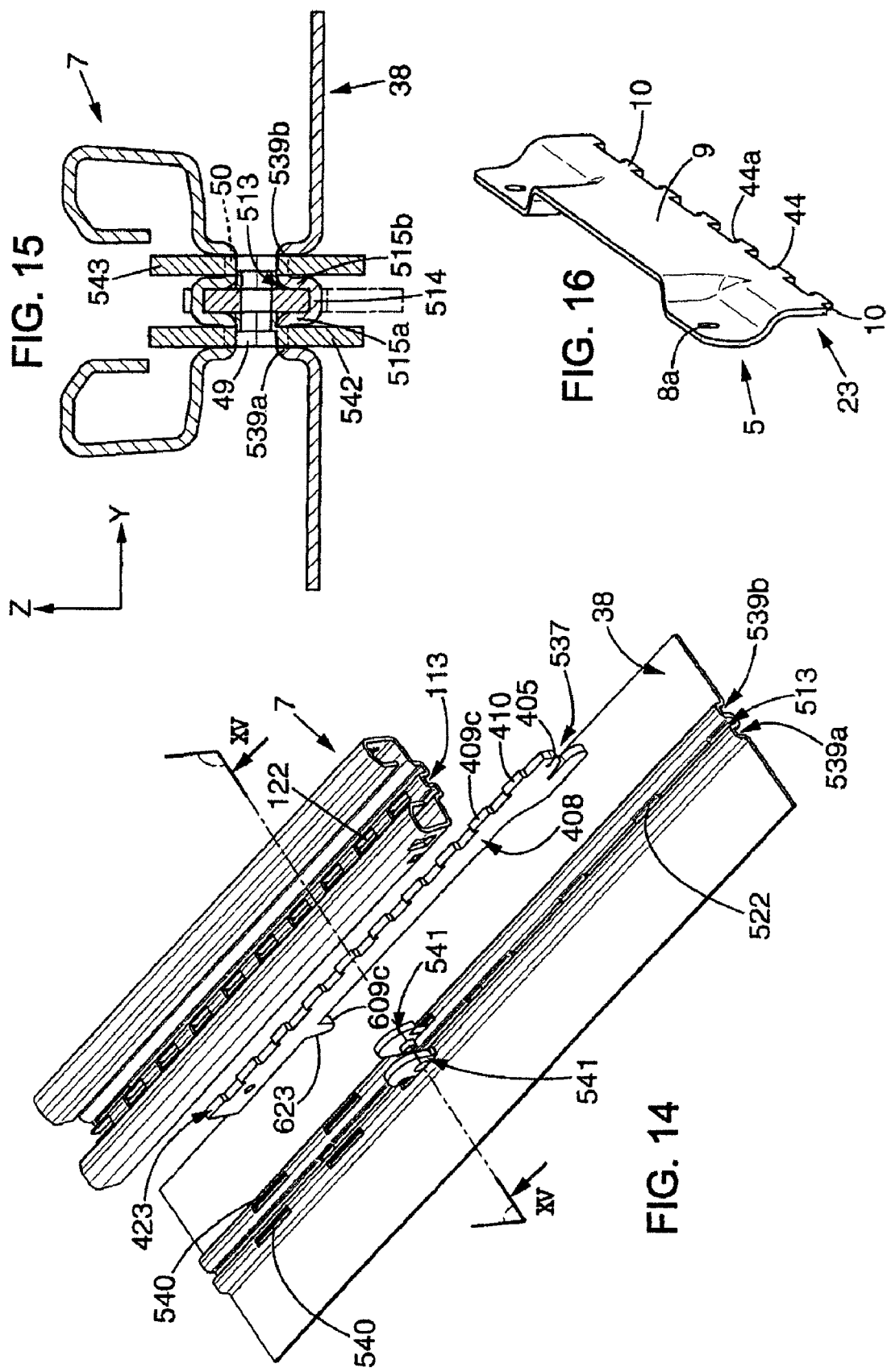

SYSTEM COMPRISING A MOTOR VEHICLE SEAT RUNNER AND BODY DESTINED TO BE FIXED THERETO, AND METHOD FOR MAKING SAME

CROSS-REFERENCE TO RELATED APPLICATIONS

This application is a U.S. national stage filing of International Patent Application No. PCT/FR2007/000503 filed on Mar. 23, 2007, which claims priority under the Paris Convention to French Patent Application No. 06 03167, filed on Apr. 10, 2006.

FIELD OF THE DISCLOSURE

The present invention relates to systems comprising a motor vehicle seat runner and a body intended to be fixed thereto, and to the methods of producing such systems.

BACKGROUND OF THE DISCLOSURE

More specifically, the invention relates mainly to a system comprising a motor vehicle seat runner and a body,
said runner comprising a fixed rail intended to be attached to the chassis of the motor vehicle, and a moving rail adapted to slide relative to the fixed rail,
the body comprising a connecting portion, in which the body is in the form of a plate having opposed first and second lateral faces and an edge face connecting said first and second faces.

Document FR 2 872 103 describes an example of a system such as this. In that system, the body is a fixing flange which is fixed, beforehand or afterwards, to the proper of the motor vehicle seat and is welded to the moving rail in two ways: in the middle, the edge face of the flange is welded to the base of the moving rail, and at the rear end, a lateral face of the flange is fixed to a vertical flange of the moving rail.

A method of attachment such as this is simple and quick, but because the fixing flange may be subjected to high loads, it is still desirable to make the connection between a motor vehicle seat runner rail and an external body even more robust.

SUMMARY OF THE DISCLOSURE

To do this, according to the invention, a system of the kind in question is characterized in that a first rail chosen from said fixed and moving rails, comprises a groove running in a longitudinal direction, said groove comprising first and second side walls spaced apart in a transverse direction and joined together at a bottom by a base,
in that the connecting portion is fitted tightly into the groove, at least a part of the first and second side walls gripping at least a part of said plate,
and in that the connecting portion is fixed to the first rail.

By virtue of these measures, the plate is inset into the rail prior to fixing, making it easier to fix and improving its robustness once fixed. It may be noted that the invention is not restricted to the fixing of a seat framework anchoring flange to the moving rail but can be applied to the fixing of any external body to a runner.

In preferred embodiments of the invention, recourse may also possibly be had to one and/or more of the following measures:

the moving rail consists of a single-piece shaped sheet metal profile;
the first rail has at least one through-hole formed in the groove,
the plate has at least one tab inserted into said through-hole;
the tab has opposed first and second faces each welded to the first rail;
the through-hole has opposed first and second lateral faces lying respectively in the continuation of the first and second side walls of the groove,
the first face of the tab is welded both to the first face of the hole and to the first side wall of the groove,
the second face of the tab is welded both to the second face of the hole and to the second side wall of the groove;
the tab has a first blocking design, and the first rail has a second blocking design, said first and second blocking designs being adapted to collaborate with one another in order to limit the movement of the edge face with respect to the first rail in a direction orthogonal to the longitudinal and transverse directions;
the tab forms a crimping portion for crimping onto a fixing side wall chosen between the first and second side walls;
the tab forms a riveting portion for riveting into the groove;
the connecting portion of the body has a plurality of tabs spaced apart in the first direction, the first rail has a plurality of through-holes each formed in the groove, and each corresponding to one of said tabs;
a first tab is crimped to the first side wall and a second tab is crimped to the second side wall;
the body has a fixing portion adapted to be fixed to said motor vehicle element, and the first and second side walls of the groove lie between the base of the groove and the fixing portion in a direction orthogonal to the longitudinal and transverse directions;
the moving rail is to slide relative to the fixed rail in the longitudinal direction (X);
the body has a fixing portion adapted to be fixed to said motor vehicle element, the first rail defines a bearing portion positioned between the groove and the fixing portion, and the body comprises a bearing member resting on the bearing portion;
the first rail has a central part of U-shaped profile with two spaced-apart parallel lateral flanges joined together by a base, and the groove is u-shaped and formed in said base;
the first and second side walls of the groove are positioned respectively facing the first and second flanges of the first rail;
said at least one part of the first and second side walls grips at least the part of the plate, coming respectively into contact with the first and second lateral faces of the plate;
the first rail is the moving rail, and the system further comprises a motor vehicle seat framework fixed to said fixing portion of the body;
the first rail is the fixed rail and the system further comprises a motor vehicle chassis fixed to said fixing portion of the body;
the body comprises a connecting leg fixed to the first rail, the system further comprising a support member secured to a second rail chosen between the fixed and moving rails, distinct from the first rail, and collaborating with at least the connecting leg, in order to hold the moving first rail in position relative to the second rail orthogonally to the longitudinal direction;
the system further comprises:
an anchoring rail for anchoring to a vehicle chassis,
an anchoring body having a fixing portion connected to the fixed rail and a connecting portion in which the anchoring body is in the form of a plate having opposed first and second lateral faces and an edge face connecting said first and second faces, the anchoring rail comprising a groove running in the longitudinal direction, said groove having a first and a second side wall which side walls are spaced apart in a transverse direction and joined together at the bottom by a base, the connecting portion of the anchoring body being fitted tightly into the groove of the anchoring rail, at least part of the first and second side walls of the groove of the anchoring rail gripping at least part of said plate of the anchoring body, the connecting portion of the anchoring body is fixed to the anchoring rail;

the first rail is the fixed rail, and said fixing portion of the anchoring body forms the connecting portion of the body, which is fixed to the fixed rail;

the system comprises a second body comprising a connecting portion, in which the second body is in the form of a plate having opposed first and second lateral faces and an edge face connecting said first and second faces, the second rail, chosen between said fixed and moving rails, distinct from the first rail, comprises a groove running in the longitudinal direction, said groove having a first and a second side wall which side walls are spaced apart in the transverse direction and joined together at the bottom by a base, the connecting portion of the second body is fitted tightly into the groove of the second rail, at least part of the first and second side walls of the groove of the second rail gripping at least part of said plate, the connecting portion of the second body is fixed to the second rail;

the plate is fixed to the groove;

the runner comprises a locking mechanism adapted to alternately adopt an active state in which relative movement of the fixed and moving rails is prevented, and an inactive state in which said movement is permitted.

According to another aspect, the invention relates to a method of manufacturing a system for a motor vehicle in which:

a runner is provided that comprises a fixed rail intended to be attached to the chassis of the motor vehicle, and a moving rail adapted to slide relative to the fixed rail, a body is provided, which body comprises a connecting portion in which the body is in the form of a plate having opposed first and second lateral faces and an edge face connecting said first and second faces, a groove running in a longitudinal direction is formed in a first rail chosen between said fixed and moving rails, said groove having first and second side walls spaced apart in a transverse direction and joined together at the bottom by a base, the connecting portion is fitted tightly into the groove, at least part of the first and second side walls gripping at least part of said plate, the connecting portion is fixed to the first rail.

In certain embodiments, the following provisions may also be made:

a moving rail is provided that consists of a single-piece shaped sheet-metal profile;

through-holes are formed in the first rail at the groove, and, when the connecting portion is inserted into the groove, a tab (10; 210; 310; 410) of the plate is inserted into said through-hole.

Other features and advantages of the invention will become apparent during the course of the following description of eight embodiments thereof, which is given by way of non-limiting example with reference to the attached drawings.

BRIEF DESCRIPTION OF THE DRAWINGS

In the drawings:

FIG. 1 is a schematic side view of a motor vehicle seat,

FIG. 2 is an exploded perspective view of a system according to a first embodiment, FIG. 7 is a view corresponding to FIG. 4 in respect of a second embodiment, FIG. 8 is a view corresponding to FIG. 3 in respect of a third embodiment, but not depicting the fixed rail, FIG. 11 is a view in section on XI-XI of FIG. 10, FIG. 12 is a partial side view of the fifth embodiment, FIG. 13 is a partial perspective view of a sixth embodiment of the invention, FIG. 14 is an exploded perspective partial view of a seventh embodiment of the invention, FIG. 15 is a view in section on XV-XV of FIG. 14, FIG. 16 is a perspective view of an eighth embodiment of the invention.

Figure 3:
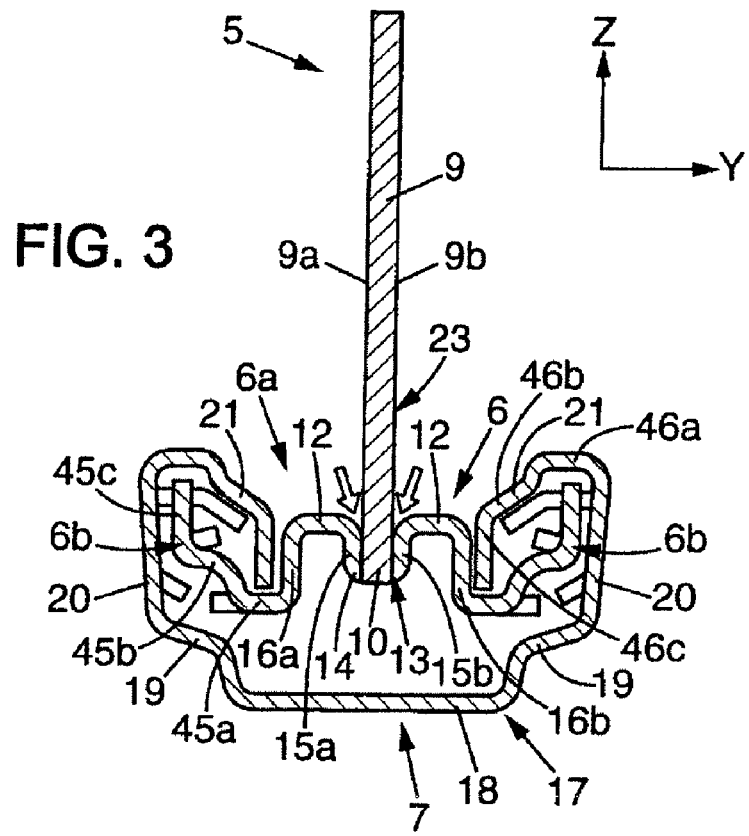
FIG. 3 is a view of the system according to the first embodiment in section on III-III of FIG. 2.

In the various figures, the same references denote elements that are identical or similar.

DETAILED DESCRIPTION OF THE DISCLOSURE

FIG. 1 very schematically depicts a motor vehicle seat 1 comprising a seat back 2 and a seat proper 3 on which the seat back 2 may, for example, be mounted. The seat proper 3 is attached to the floor P of the chassis of the motor vehicle via one or more runners (for example two lateral runners) 4 in a way that will be described in greater detail hereinafter.

The seat proper 3 generally comprises a rigid metal framework (not depicted) comprising two spaced-apart lateral arms running in the longitudinal direction of the seat part and joined together by crossmembers, these lateral arms each being mounted on a flange 5 itself attached to the moving rail 6 of the runner 4. This runner 4 also comprises a fixed rail 7 which is attached, generally fixed, to the chassis of the motor vehicle. As will be described in greater detail hereinafter, the moving rail 6 and the fixed rail 7 have complementing shapes allowing the moving rail 6 to slide, in a sliding direction X, relative to the fixed rail, thus allowing the longitudinal position of the seat 1 in the passenger compartment to be adjusted.

As is particularly visible in FIG. 2, the flange 5 may form a body for fixing the runner to the seat proper framework. A flange such as this comprises a portion collaborating with the seat proper, which in the example depicted so happens to be the upper portion thereof, for fixing to the seat proper. This fixing portion comprises, for example, two holes 8*a*, 8*b* located respectively in the back and in the front of the fixing body 5, and which are fixed directly to the seat proper framework, for example by bolting, or which bear the bottom ends of link rods that form a system for height adjustment of the seat proper, or by any other suitable means of fixing.

In its lower portion, the fixing body 5 comprises a rigid metal plate 9 running in the direction of the moving rail 6. In the example depicted, the entire fixing body 5 is produced in the form of a plate such as this. However, the fixing portion 8a, 8b for fixing to the seat proper framework could be produced differently. The plate 9 comprises opposed parallel first 9a and second 9b lateral faces running in the sliding direction X and vertically in the example depicted. The plate 9 runs vertically downwards as far as its edge face 9c. The plate is cut vertically from its edge face toward the top to define, on the one hand, fixing tabs 10 running vertically downward and comprising the edge face and, alternating with these fixing tabs, bearing tabs 11a, 11b bent over horizontally and positioned on either side of the plate 9.

As depicted in FIG. 3, one of the two rails 6, 7 is a male rail which nests inside the other rail termed the female rail. In the embodiments of the invention that will be described hereinafter, the male rail consists of the upper moving rail 6, while the female rail consists of the lower fixed rail 7, but this arrangement could be reversed without departing from the scope of the invention.

The two rails 6 and 7 each consist of a shaped metal sheet obtained by any known method, for example by stamping, shaping or extrusion. In addition, these rails have a cross section that is substantially constant over their entire length, except for any recesses, cut-outs, tooth sets or other means of connection or of locking that may be formed in said rails or attached thereto.

In the first embodiment depicted in FIG. 3, the male rail 6 has a central portion 6a on either side of which there extend two lateral portions 6b. The central portion 6a comprises a horizontal base 12 in which there is formed a groove 13 which, in its bottom, comprises a horizontal central base 14 from either side of which two side walls 15a, 15b rise up vertically as far as the base 12. Extending vertically downwards from either side of the base 12, there are two flanges 16a, 16b that complete the central portion 6a of the moving rail. Each lateral portion 6b comprises a flap which extends outward and upward from the lower end of the corresponding flange 16a, 16b of the central part 6a of the moving rail.

Each of these flaps has, starting from the lower end of the corresponding flange 16a, 16b, a short horizontal section 45a, a curved section 45b, which, on the one hand, has a concave underside running outward and downward at a more or less 45° angle, thereby forming a longitudinal channel section and, on the other hand, a convex upper face and a vertical end portion 45c.

Furthermore, the female rail 7 for its part comprises:
  a horizontal bottom 17 which has, on the one hand, a flat horizontal central part 18 fixed to the floor of the vehicle and, on the other hand, two substantially horizontal lateral raised portions 19 positioned a certain height above the floor P,
  two vertical flanges 20 which run upwards from the raised portions 19, thereby delimiting two rounded corners positioned facing the concave interior faces of the aforementioned curved sections 45b, the two flanges 20 each running as far as an upper end edge,
  and two reentrant troughs 21 which extend these end edges inward and downward, fitting in between the flanges 16a, 16b and the flaps of the male rail.

These troughs 21 each comprise, starting from the upper end of the flanges 20:
  a short horizontal section 46a positioned a short distance above the vertical end portion 45c of the corresponding flap of the moving rail,
  an angled section 46b of straight cross section which runs at an angle inward and downward, for example at substantially 45°, and
  a vertical section 46c positioned in close proximity to the flange 16a, 16b and running up close to the horizontal section 45a of the corresponding flap.

The two rails between them delimit four ball pathways, namely:
  on the one hand, two first ball pathways each of which is delimited between a reentrant trough 21 and the corresponding flap and which each contain a group of rigid, metal or plastic, balls,
  and, on the other hand, two second ball pathways each delimited between a flap and the corresponding corner region and each of which contains a group of rigid, particularly metal, balls, these balls being identical or substantially identical to the aforementioned balls.

In the first embodiment depicted in FIG. 3, the spacing of the side walls 15a, 15b of the groove 13 in a transverse direction is substantially equal to or less than the thickness of the plate 9 so that during assembly, the plate 9 can be fitted tightly into the groove 13, the first 9a and second 9b lateral faces of the plate 9 bearing against and being gripped by the faces of the side walls 15a and 15b that lie on the inside of the groove.

As depicted particularly in FIG. 2, in this first embodiment, the base 14 of the groove 13 has a plurality of through-holes 22 running longitudinally in the direction of the groove, and of a width, measured in a transverse direction Y, substantially equal to the thickness of the edge face 9c of the plate 9 and of a length, measured in the sliding direction X, equal to or greater than the length of the fixing tabs 10 belonging to the plate 9. The transversely spaced lateral faces of the hole 22 therefore lie substantially in the continuation of the respective side walls of the groove.

The fixing tabs 10 are inserted into the through-holes 22 of the moving rail in such a way that the lateral faces of the fixing tabs 10 bear against the lateral faces opposite them belonging to the holes 22. In that way, the fixing body 5 is prevented from moving in the Y direction relative to the moving rail. The connecting portion 23 of the plate 9 is fixed to the moving rail for example by welding in the region of the thick arrows of FIG. 3. Welding such as this can be performed on the entire part where the plate 9 and the moving rail 6 are in contact, thus ensuring that the fixing body 5 is securely fixed to the moving rail because the weld does not have to be confined to the thickness of the edge face.

Thus, the welding on the one hand welds together the face 9a, 9b of the plate 9 and the face of the corresponding side wall 15a, 15b of the groove, and on the other hand welds together the face 9a, 9b of the plate 9 and the lateral face of the hole 22.

Figure 4:
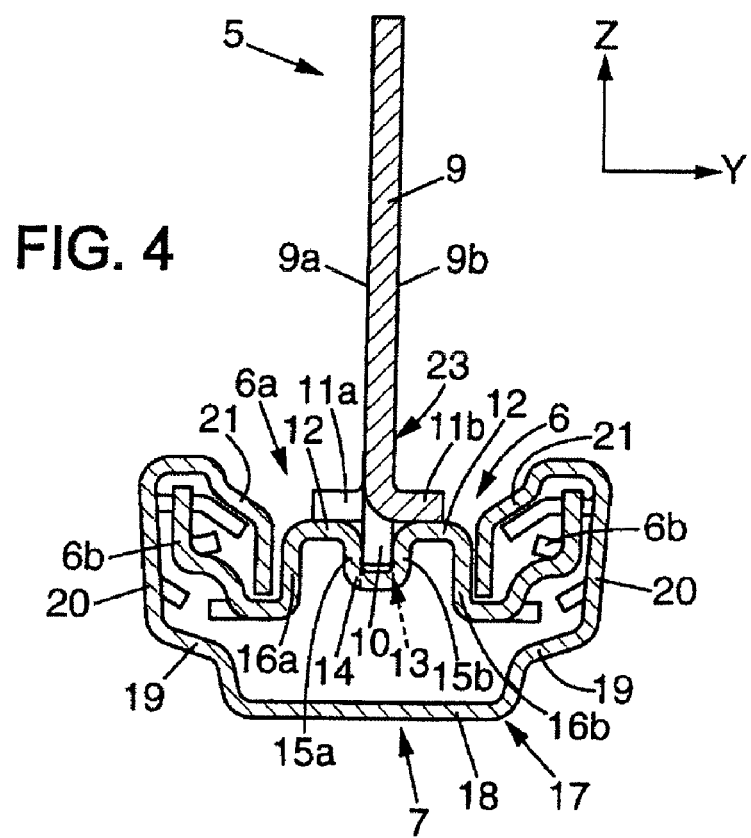
FIG. 4 is a view of the system according to the first embodiment in section on IV-IV of FIG. 2.

As depicted in FIG. 4, the bearing tabs 11 (not depicted in FIG. 3 in order to make FIG. 3 less cluttered) bear against the base 12 that forms a horizontal bearing portion and lies between the base 14 of the groove and the fixing portion of the plate 9. This bearing surface is created in alternating fashion on each side of the plate 9, outside of the regions via which the tabs 10 of the plate are welded into the groove. They therefore give the system greater stability in respect of forces along the Y axis.

In the embodiment depicted in FIGS. 2, 3 and 4, it will be noted that the groove 13, which is U-shaped, is formed in the base 12 of the moving rail in such a way that the side walls 15a, 15b are positioned facing the respective flanges 16a, 16b of the moving rail.

Figure 5:
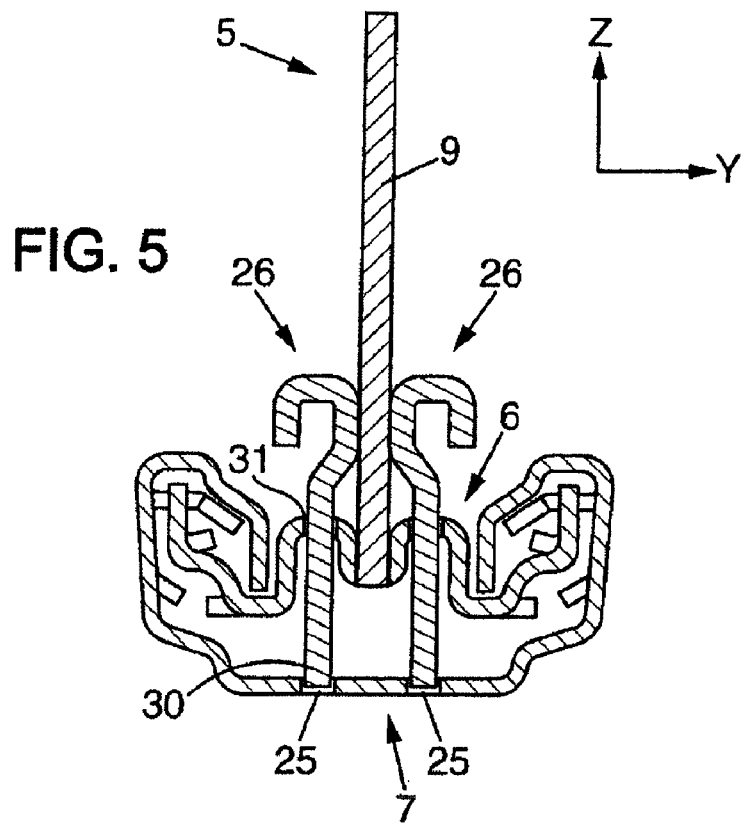
FIG. 5 is a view corresponding to FIG. 3 depicting one example of a locking system for the first embodiment, in the locked position.
Figure 6:
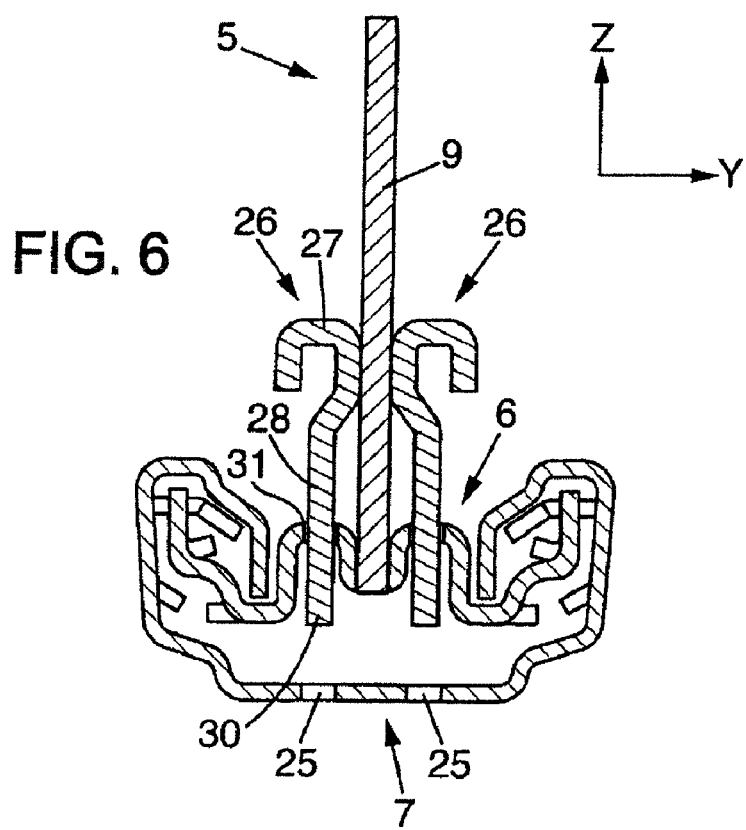
FIG. 6 is a view corresponding to FIG. 5 with the locking system in the unlocked position.

FIGS. 5 and 6 illustrate one example of a locking system for the first embodiment. As may be seen in FIG. 5, holes 25, uniformly spaced in the sliding direction, are formed in the flat horizontal central part of the fixed rail 7. As may be seen in FIG. 6, locking fingers 26 are positioned on either side of the plate 9. The locking fingers 26 comprise an actuating portion 27, a guide portion 28 and a locking portion 30. The base 12 of the moving rail has a guiding through-hole 31, of a cross section that complements the cross section of the guiding portion of the locking finger 26. As the runner is being assembled, the locking fingers 26 are introduced from above into the moving rail, with the guide portion introduced into the guide hole of the moving rail. The moving rail is inserted into the fixed rail 6 by sliding. A spring, not depicted, permanently urges the locking finger 26 downward into a position in which the locking portion 30 collaborates with one of the holes 25 in the fixed rail in order to lock the runner.

As depicted in FIG. 6, when the user instigates the unlocking of the runner, for example by actuating a control member collaborating with the hook-shape of the actuating portion 27, this moves the locking finger 26 upward against the force of the spring, not depicted, until the locking portion 30 of the locking finger 26 is freed from the corresponding holes 25 in the fixed rail. During this movement, the locking finger 26 is entirely guided by the upper guide hole of the moving rail, which is of a shape that complements the guide portion of the locking finger, thus preventing any travel in the X and Y directions.

When the seat occupant has reached the desired longitudinal position for the vehicle seat in the passenger compartment, he can release the control so that the runner will automatically re-lock under the effect of return springs, not depicted, urging the locking fingers 26 into the locked position of FIG. 5.

Means of fixing the plate 9 to the moving rail 6 of the runner other than by welding may be used. In this regard, FIG. 7 depicts a second embodiment which reproduces the features of the first embodiment except that the plate 9 is fixed to the moving rail 6 by crimping in this instance. By way of example, provision is made for a first fixing tab 10 to be introduced through a through-hole 22 and crimped onto or folded over tightly against, the side wall 15b of the groove 13, and for a second fixing tab 10, situated to the rear of the first tab in the sliding direction, to be introduced through another through-hole and crimped onto the side wall 15a of the groove. Alternating the crimping onto each of the side walls 15b, 15a of the groove in this way can be repeated along the entire length of the plate 9 in the sliding direction.

A third embodiment is depicted partially in FIG. 8. The fixed rail of this third embodiment is identical to those of the first and second embodiments and so is not depicted again, in order to make the drawing simpler. This third embodiment differs from the first embodiment in that the plate 9 is fixed to the moving rail 6 by a plurality of tabs 10 forming portions for riveting the plate 9 which are introduced into the through-holes and then deformed into the shape depicted in FIG. 8 in order to hold the plate in position on the rail.

In this third embodiment, it will also be noted that, independently of the way in which the plate 9 is fixed to the moving rail 6, the bearing tabs 11a and 11b are produced in the form of elements of triangular cross section, the bases of which bear against the web 12 of the moving rail. It will be noted that a wide variety of bearing tab shapes is conceivable within the context of the invention.

It will be noted that a broad range of fixings for fixing the connecting portion of the plate 9 to the moving rail 6 is conceivable within the context of the invention.

Figure 9:
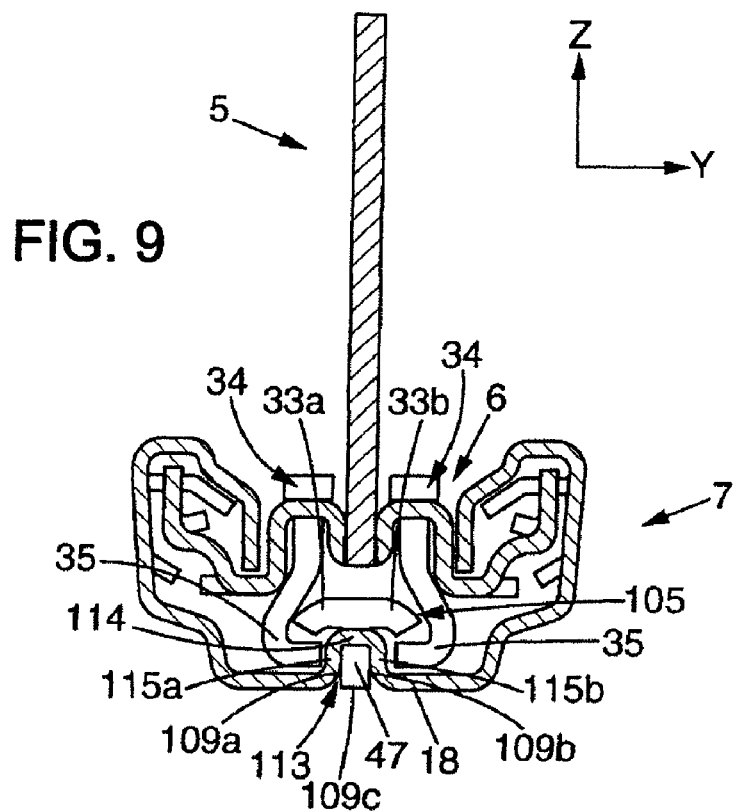
FIG. 9 is a view corresponding to FIG. 3 in respect of a fourth embodiment.

FIG. 9 depicts a system according to a fourth embodiment. In this fourth embodiment, by way of example, the fixing body 5 for fixing to the motor vehicle seat is fixed to the moving rail 6 in the way described with reference to FIGS. 2 and 3.

In this embodiment, the fixed rail differs from the fixed rail depicted in relation to the first embodiment in that a groove 113 is created in the flat horizontal central part 18 of the fixed rail. In the embodiment depicted, this groove has a substantially horizontal base 114 joining together at the bottom to lateral side walls 115a, 115b running substantially vertically toward the flat horizontal central part of the fixed rail 7. In the example shown, the groove 113 is produced in the fixed rail such that it is "re-entering" the fixed rail, i.e. mainly directed substantially toward the moving rail. What is more, a through-hole 122 (in FIG. 9) is made in the bottom of the groove 113. This through-hole is produced over practically the entire length of the fixed rail 7. A body 105 comprises a connecting portion for connecting to the runner in the form of a connecting leg 47. The system further comprises support elements 34 sliding relative to the connecting leg 47 in the sliding direction. The connecting leg 47 for example comprises two lateral fingers 33a, 33b extending laterally, and joined together by a vertical plate 109 forming a single tab inserted through the through-hole 122 of the fixed rail, and the lateral side walls 109a, 109b of which are gripped tightly by, respectively, the side walls 115a, 115b of the groove 113 of the fixed rail and run as far as an edge face 109c. The connecting leg 47 is also fixed, for example welded, to the fixed rail, as explained previously in respect of the fixing body 5 and the moving rail 6 in conjunction with FIG. 3.

The support element or elements 34 collaborate with the moving rail 6 by insertion therein and are secured thereto. These support elements 34 each comprise a return portion 35 inserted under a corresponding lateral finger 33a, 33b of the connecting leg 47 and designed to collaborate with, on the one hand, the flat horizontal central part 18 of the fixed rail in order to limit a downward vertical movement of the moving rail and, on the other hand, the corresponding lateral fingers 33a, 33b, in order to limit an upward vertical movement of the moving rail, for example in the event of an impact.

It will be noted that, as an alternative form of this fourth embodiment, use is not necessarily made of a moving rail like the one depicted in FIG. 9 but that it is possible to use any type of known moving rail, such as, in particular, a rail in which the base 12 of the central portion has no groove.

According to a fifth embodiment depicted partially in FIGS. 10 and 11, use is made of a fixed rail 7 that has a groove 113 as explained hereinabove in conjunction with FIG. 9. At the front or rear end of the fixed rail, the base 114 of the groove is provided with two through-holes 122 spaced longitudinally apart. A fixing body 205 comprises a fixing portion 208 for fixing to a floor of the chassis of the motor vehicle, and a connecting portion 223 produced in the form of two studs each designed to be inserted in a complementary through-hole 122 made in the fixed rail.

As explained previously, each stud corresponds to a plate that has two vertical lateral faces 209a, 209b rising up as far as an edge face 209c. They are tightly fitted into the through-holes 122 so that they are held rigidly in both the lateral and longitudinal direction, and the fixing body 205 is fixed to the fixed rail, for example by welding the studs of the connecting portion 223 into the through-holes 122 of the fixed rail. The fixing portion 208 of the fixing body 205 may have a hole 48 located directly under the groove of the fixed rail, and the fixed rail may have a through-hole 36 facing the hole 48 in the fixing body 205, so that a fixing member can be inserted through these holes to hold the fixed rail 7 in place on the floor of the vehicle.

Figure 10:
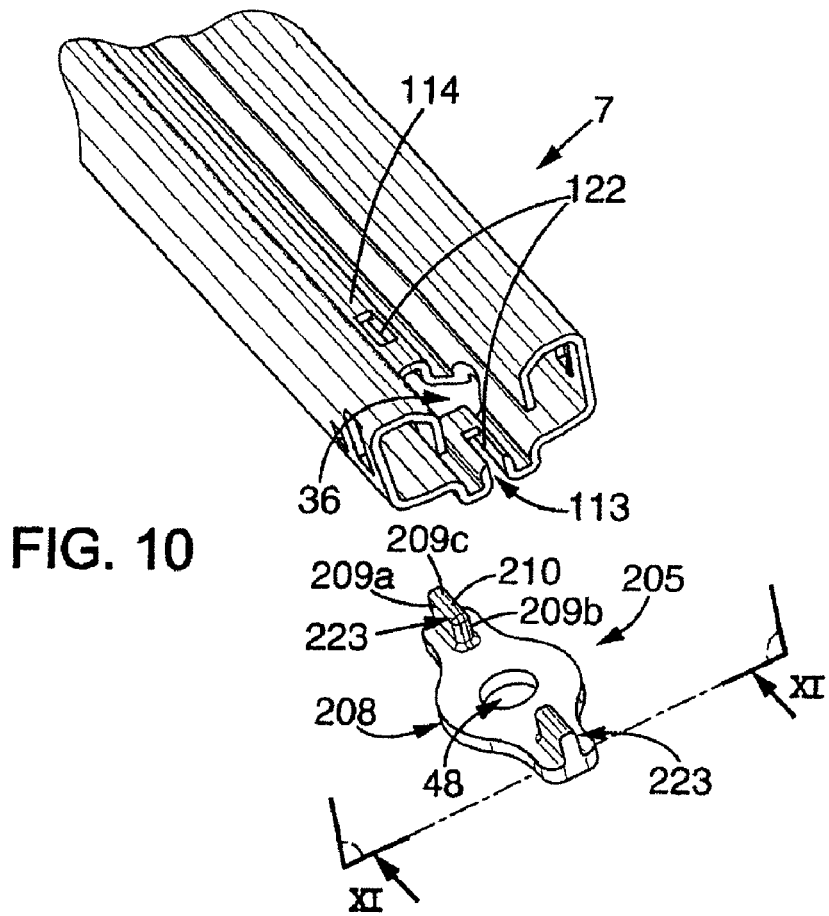
FIG. 10 is a partial exploded perspective view of a fifth embodiment.

FIG. 12 now describes one example of how the runner described according to the fifth embodiment depicted in FIGS. 10 and 11 can be fixed to the floor of the motor vehicle. It will be noted that FIG. 12 depicts the fixing body 205 intended to be fixed to the front of the fixed rail 7, described previously in conjunction with FIGS. 10 and 11, and which will therefore not be described in greater detail here. FIG. 12 also shows a fixing body 305 intended to be fixed to the rear of the fixed rail 7 and to be anchored to the floor of the motor vehicle. A fixing body 305 such as this also comprises a connecting portion 323 produced in the form of a substantially vertical plate comprising two fixing tabs 310 comprising two opposed lateral faces extending as far as an edge face. Each tab is inserted, as described previously, tightly into the groove of the fixed rail 7, possibly into a hole 122 formed for that purpose. A fixing body 305 is fixed to the fixed rail, for example by welding the tabs 310 into the groove. The fixing body 205 also comprises a fixing portion 308 for fixing to the chassis of the motor vehicle, this being produced for example in the form of a hook 37 designed to catch on a complementary structure fixed to the chassis of the motor vehicle when the runner is being fitted. During this fitting, the hook 37 catches on this complementary part, at the rear, then the fixing body 205 is fixed, for example screwed, to the chassis of the motor vehicle. It will be noted that, in place of the fixing body 205 depicted here and described in detail in FIG. 10, use may be made of the fixing body described hereinafter in conjunction with FIG. 13.

As an alternative, as depicted in FIG. 13, according to a sixth embodiment, the fixing body 205 may comprise a vertical plate 209 bearing the fixing tabs 210, and from which the fixing portion 208 provided with the hole 48 for fixing the system to the floor of the motor vehicle extends at right angles. In an alternative form of embodiment such as this, the hole 36 made in the bottom of the fixed rail of the runner as depicted in FIG. 10 is not necessarily needed.

A seventh embodiment is now described in conjunction with FIGS. 14 and 15. According to this seventh embodiment, use is made of a fixed rail 7 having a groove, as described previously, particularly in conjunction with FIG. 9. In this seventh embodiment, the fixed rail has, in the bottom of the groove 113, a plurality of through-holes 122 spaced longitudinally apart. A fixing body 405 is in the form of a plate of which the upper part, that forms the connecting portion 423, has a plurality of fixing tabs 410 with opposed lateral faces extending as far as an edge face 409c. Each tab 410 is mounted in a through-hole 122 of the fixed rail, the fixing body 405 being fixed to the fixed rail in any appropriate way described previously, such as, for example, by welding the lateral faces of the plate to the groove 113. In this seventh embodiment, the fixed rail 7 also has two through-holes 50 (visible in FIG. 15), created one on each side of the groove, in the flat horizontal central part 18 of the fixed rail.

The system further comprises an anchoring rail 38 for anchoring to a vehicle chassis. The fixing body 405 comprises a fixing portion 408 intended to be connected to the anchoring rail 38. This fixing portion 408 comprises a connecting portion 623 for connecting to the anchoring rail and formed of two lateral side walls extending vertically downwards as far as an edge face 609c. The anchoring rail 38 comprises a groove 513 produced in the form of a u having a base 514 from which two side walls 515a, 515b extend, vertically upwards in the example depicted, toward the fixing body 405. The anchoring rail also comprises a plurality of through-holes 522 formed in the bottom of the groove 513 and spaced longitudinally apart. According to the seventh embodiment, the connecting portion 423 of the fixing body 405 is fitted tightly between the side walls 515a and 515b of the groove of the anchoring rail for anchoring to the chassis of the vehicle, and is inserted at least partially through a through-hole 522 in the anchoring rail.

The latter further comprises two lateral grooves 539a, 539b positioned one on each side of the central groove 513. These lateral grooves are each provided with through-holes 540 designed to accept the members 541 for catching on the floor. These members are, for example, produced in the form of two opposed hooks each mounted such that it can rotate on the fixing body 405 about an axis 49 transverse to the vehicle. Each of the floor-catching members 541 comprises a lower catching portion 542 intended to catch on a complementary element of the chassis of the motor vehicle, and an upper catching portion 543 inserted in the aforementioned hole 50 in the fixed rail 7.

The fully assembled system that has just been described is fixed to the floor as follows. First of all, the rear of the runner is fixed to the floor via a hook portion 537 similar to the hook 37 described previously in conjunction with FIG. 12. The system is then rotated firmly against the floor, the lower catching portions 542 rotating about the transverse axis 49 to hook onto a complementary portion belonging to the floor of the motor vehicle. During the course of this movement, the upper catching portion 543 of these hooks engages with the flat horizontal central part 18 of the fixed rail. This results in firm and effective anchorage of the runner to the chassis of the motor vehicle.

FIG. 16 depicts an eighth embodiment of the system according to the invention. The connecting portion 23 of the plate 9 of the fixing body 5 has a plurality of fixing tabs 10 each designed to be inserted into a corresponding through-hole 22 in the moving rail 6. One fixing tab 10, or each fixing tab, may have a blocking design 44 produced, for example, in the form of a protrusion having an upper surface 44a directed toward the inner face of the base 14 of the groove 13. As the fixing body 5 is inserted into the moving rail 6, this is first of all inserted vertically and then shifted, for example backward, in the longitudinal direction, until the upper surface 44a of the fixing tabs 10 faces the internal face of the base 14 of the groove 13, that forms a second blocking design that complements the first blocking design 44, so that, in this position, upward vertical movement of the fixing body 5 with respect to the moving rail 6 is prevented by the upper surface 44a of the protrusion 44 being blocked against a complementary part of the moving rail.

In this position, before the connecting portion 23 is fixed to the moving rail 6, rotation about the axis of sliding X of the fixing body with respect to the moving rail, vertical upwards and horizontal rearward movements, in the example being considered, are prevented, thus conferring great rigidity upon the runner. Next, the connecting portion 23 and the moving rail 6 are fixed together, for example by welding as described previously in conjunction with FIG. 2.

It will be noted that the geometry described here in the context of the eighth embodiment for the tabs preventing the upward vertical movement of the fixing body 5 may also be used in any of the embodiments already described.

Where appropriate, attachment by crimping, as depicted in FIG. 7, or by riveting, as depicted in FIG. 8, may be used in place of, or in addition to, the welded connections described.

The following advantages can be obtained for at least one of the embodiments discussed hereinabove:
- rigid attachment of the fixing body to the runner profile,
- better moment of inertia of the runner profile,
- simple, quick welded connections with good repeatability,
- potential to reduce the thickness of the rails for equivalent rigidity, thus reducing weight,
- possibility of using inert gas (MIG) welding,
- effective locking.

The invention claimed is:

1. A system comprising:
a motor vehicle seat runner; and a body, said runner comprising a fixed rail intended to be attached to the chassis of the motor vehicle, and
a moving rail adapted to slide relative to the fixed rail, the body comprising a connecting portion, in which the body is in the form of a plate having opposed first and second lateral faces and an edge face connecting said first and second faces,
wherein a first rail chosen from said fixed and moving rails, comprises a groove running in a longitudinal direction, said groove comprising first and second side walls spaced apart in a transverse direction and joined together at a bottom by a base, in that the connecting portion is fitted tightly into the groove, at least a part of the first and second side walls gripping at least a part of said plate, and
wherein the connecting portion is fixed to the first rail.

2. The system according to claim 1, in which the moving rail consists of a single-piece shaped sheet-metal profile.

3. The system according to claim 1, in which the first rail has at least one through-hole formed in the groove, in which the plate has at least one tab inserted into said through-hole.

4. The system according to claim 3, in which the tab has opposed first and second faces each welded to the first rail.

5. The system according to claim 4, in which the through-hole has opposed first and second lateral faces lying respectively in the continuation of the first and second side walls of the groove,
in which the first face of the tab is welded both to the first face of the hole and to the first side wall of the groove,
in which the second face of the tab is welded both to the second face of the hole and to the second side wall of the groove.

6. The system according to claim 3, in which the tab has a first blocking design, and the first rail has a second blocking design, said first and second blocking designs being adapted to collaborate with one another in order to limit the movement of the edge face with respect to the first rail in a direction orthogonal to the longitudinal and transverse directions.

7. The system according to claims 3, in which the tab forms a crimping portion for crimping onto a fixing side wall chosen between the first and second side walls.

8. The system according to claim 3, in which the tab forms a riveting portion for riveting into the groove.

9. The system according to claim 3, in which the connecting portion of the body has a plurality of tabs spaced apart in the longitudinal direction, in which the first rail has a plurality of through-holes each formed in the groove, and each corresponding to one of said tabs.

10. The system according to claim 9, in which a first tab is crimped to the first side wall and a second tab is crimped to the second side wall.

11. The system according to claim 7, in which the body has a fixing portion adapted to be fixed to a motor vehicle element, and in which the first and second side walls of the groove lie between the base of the groove and the fixing portion in a direction orthogonal to the longitudinal and transverse directions.

12. The system according to claim 7, in which the moving rail (6) is adapted to slide relative to the fixed rail in the longitudinal direction.

13. The system according to claim 7, in which the body has a fixing portion adapted to be fixed to a motor vehicle element, in which the first rail defines a bearing portion positioned between the groove and the fixing portion, and in which the body comprises a bearing member resting on the bearing portion.

14. The system according to claim 7, in which the first rail has a central part of U-shaped profile with two spaced-apart parallel lateral flanges joined together by a base, and in which the groove is u-shaped and formed in said base.

15. The system according to claim 14, in which the first and second side walls of the groove are positioned respectively facing the first and second flanges of the first rail.

16. The system according to claim 7, in which said at least one part of the first (15a; 115a) and second (15b; 115b) side walls grips at least the part of the plate, coming respectively into contact with the first and second lateral faces of the plate.

17. The system according to claim 7, in which the first rail is the moving rail, and further comprising a motor vehicle seat framework fixed to said fixing portion of the body.

18. The system according to one of claim 1, in which the first rail is the fixed rail and further comprising a motor vehicle chassis fixed to said fixing portion of the body.

19. The system according to claim 7, in which the body comprises a connecting leg fixed to the first rail, the system further comprising a support member secured to a second rail chosen between the fixed and moving rails, distinct from the first rail, and collaborating with at least the connecting leg, in order to hold the moving first rail in position relative to the second rail orthogonally to the longitudinal direction.

20. The system according to claim 7 and further comprising:
an anchoring rail for anchoring to a vehicle chassis,
an anchoring body having a fixing portion connected to the fixed rail and a connecting portion in which the anchoring body is in the form of a plate having opposed first and second lateral faces and an edge face connecting said first and second faces,
the anchoring rail comprising a groove running in the longitudinal direction, said groove having a first and a second side wall, which side walls are spaced apart in a transverse direction and joined together at the bottom by a base
the connecting portion of the anchoring body being fitted tightly into the groove of the anchoring rail, at least part of the first and second side walls of the groove of the anchoring rail gripping at least part of said plate of the anchoring body, in which the connecting portion of the anchoring body is fixed to the anchoring rail.

21. The system according to claim 20, in which the first rail is the fixed rail, and in which said fixing portion of the anchoring body forms the connecting portion of the body, which is fixed to the fixed rail.

22. The system according to claim 7, comprising a second body comprising a connecting portion, in which the second body is in the form of a plate having opposed first and second lateral faces and an edge face connecting said first and second faces, in which the second rail, chosen between said fixed and moving rails, distinct from the first rail, comprises a groove running in the longitudinal direction, said groove having a first and a second side wall, which side walls are spaced apart in the transverse direction and joined together at the bottom by a base in which the connecting portion of the second body is fitted tightly into the groove of the second rail, at least part of the first and second side walls of the groove of the second rail gripping at least part of said plate, in which the connecting portion of the second body is fixed to the second rail.

23. The system according to claims 7, in which the plate is fixed to the groove.

24. The system according to claim 7, in which the runner comprises a locking mechanism adapted to alternately adopt an active state in which relative movement of the fixed and moving rails is prevented, and an inactive state in which said movement is permitted.

25. A method of manufacturing a system for a motor vehicle comprising:

a runner is provided that comprises a fixed rail intended to be attached to the chassis of the motor vehicle, and a moving rail adapted to slide relative to the fixed rail, a body is provided, which body comprises a connecting portion in which the body is in the form of a plate having opposed first and second lateral faces and an edge face connecting said first and second faces, and a groove running in a longitudinal direction is formed in a first rail chosen between said fixed and moving rails, said groove having first and second side walls spaced apart in a transverse direction and joined together at the bottom by a base, wherein the connecting portion is fitted tightly into the groove, at least part of the first and second side walls gripping at least part of said plate, the connecting portion is fixed to the first rail.

26. The method according to claim 25, in which a moving rail is provided that consists of a single-piece shaped sheet-metal profile.

27. The method according to claim 25 in which through-holes are formed in the first rail at the groove, and in which, when the connecting portion is inserted into the groove, a tab of the plate is inserted into said through-hole.

* * * * *